United States Patent [19]

Kump

[11] Patent Number: 5,922,490
[45] Date of Patent: Jul. 13, 1999

[54] SPIRAL-WOUND LEAD-ACID BATTERIES HAVING CAPACITY ADAPTERS

[75] Inventor: William H. Kump, St. Paul, Minn.

[73] Assignee: GNB Technologies, Inc., Mendota Heights, Minn.

[21] Appl. No.: 08/744,374

[22] Filed: Nov. 7, 1996

[51] Int. Cl.$^6$ .................................................. H01M 2/00
[52] U.S. Cl. .......................................... 429/163; 429/177
[58] Field of Search .............................. 429/96, 99, 100, 429/149, 163, 167, 177

[56] References Cited

U.S. PATENT DOCUMENTS

| | | | |
|---|---|---|---|
| Re. 31,458 | 12/1983 | Trattner | 429/100 |
| 2,784,245 | 3/1957 | Coleman et al. | |
| 3,738,058 | 6/1973 | Mabuchi | 46/243 |
| 3,969,148 | 7/1976 | Trattner | 136/173 |
| 3,990,919 | 11/1976 | Krueger | 429/100 |
| 3,998,516 | 12/1976 | Mabuchi | 339/153 |
| 4,037,026 | 7/1977 | Mabuchi | 429/100 |
| 4,057,677 | 11/1977 | Mabuchi | 429/100 |
| 4,346,151 | 8/1982 | Uba et al. | 429/54 |
| 4,397,920 | 8/1983 | Trattner | 429/100 |
| 4,431,717 | 2/1984 | Kikuchi | 429/100 |
| 4,592,972 | 6/1986 | Juergebs et al. | 429/160 |
| 4,648,177 | 3/1987 | Uba et al. | 29/623.2 |
| 4,767,358 | 8/1988 | Nullmeyer et al. | 439/500 |
| 5,264,303 | 11/1993 | McCaffery | 429/99 |

*Primary Examiner*—Kathryn Gorgos
*Assistant Examiner*—Thomas H. Parsons
*Attorney, Agent, or Firm*—Leydig, Voit & Mayer, Ltd.

[57] ABSTRACT

A multicell, lead-acid battery having spiral-wound cell elements and capacity adapters is disclosed, the battery comprising a container having a plurality of cell cavities, each cell cavity having a volume adapted to receive a spiral wound cell element of a specific maximum electrochemical capacity, a spiral-wound cell element being disposed in each cell cavity having a capacity less than the specific maximum capacity and of a size smaller than a cell element having the specific maximum capacity, thus creating a void volume in the cell cavity in which it is disposed, and a capacity adapter being disposed in each cell cavity which occupies at least a portion of the void volume.

8 Claims, 4 Drawing Sheets

SPIRAL-WOUND LEAD-ACID BATTERIES HAVING CAPACITY ADAPTERS

FIELD OF THE INVENTION

This invention relates to multicell, lead-acid batteries, and more particularly, to multicell, lead-acid batteries having spiral-wound cell elements and capacity adapters.

BACKGROUND OF THE INVENTION

One common type of lead-acid battery utilizes so-called "spiral-wound" cell elements. Such spiral-wound cell elements include thin plates and separators which are layered and then rolled into a spiral.

The housings for batteries having spiral-wound elements typically incorporate a container which has a plurality of cup-shaped cell cavities. The internal volume of the cell cavity is adapted to receive the cell elements. The cell cavities are usually interconnected by intercell partitions, defined at mutual tangent zones, and a cover is provided. The cover encloses the container and provides sufficient head space to install appropriate element straps, intercell connections, terminals, pressure-release valves, and the like.

Due to the various dimensional and performance requirements imposed on battery manufacturers by vehicle manufacturers, it would be desirable to manufacture batteries having different electrochemical capacities but the same external dimensions. Since the cell elements determine in large part the capacity of a battery, the chemical composition and the design of the plates may be varied to provide different capacities. This approach, however, is not always desirable, especially for relatively small variations among a line of batteries designed for similar applications. Changing plate design and variation of plate composition entails a corresponding increase in the number of plate manufacturing processes.

It is, however, relatively easy to vary the capacity of an element by varying the size of the plates. For example, a plate may be reduced in length or height, thereby reducing the electrochemical surface area and capacity of the cell element.

Reducing the height or length of the plates, however, necessarily reduces the height or width of the resulting spiral-wound element, and the cell cavities for a spiral-wound battery typically are uniformly sized to receive cell elements having a specific maximum electrochemical capacity. Thus, it would be necessary to reconfigure the other battery components to accommodate smaller capacity cell elements. This involves, at a minimum, redesign of the container, and may involve, at even greater expense and inconvenience, redesign of the cover and top lead.

It is an object of the subject invention, therefore, to provide various multicell, lead-acid batteries with spiral-wound elements, whereby the batteries have different electrochemical capacities but substantially the same external dimensions.

Another object is to provide such batteries which may be manufactured and assembled more easily. A related and more specific object is to provide such batteries which utilize a common container and cover.

Yet another object is to provide such spiral-wound, multicell, lead-acid batteries wherein all of the above advantages are realized.

Those and other objects and advantages of the invention will be apparent to those skilled in the art upon reading the following description and upon reference to the drawings.

SUMMARY OF THE INVENTION

The subject invention provides for a multicell, lead-acid battery having spiral-wound cell elements and capacity adapters. In general, the battery comprises a container having a plurality of cell cavities. Each cell cavity has a volume adapted to receive a spiral wound cell element of a specific maximum electrochemical capacity. A spiral-wound cell element is disposed in each cell cavity, and each cell element has a capacity less than the specific maximum capacity and is of a size smaller than a cell element having the specific maximum capacity, thus creating a void volume in the cell cavity in which it is disposed. A capacity adapter is disposed in each cell cavity and occupies at least a portion of the void volume.

As will be discussed in further detail below, by coordinating the relative size of the cell element and capacity adapter, different batteries may be assembled with different electrochemical capacities without varying the external size and configuration of the battery and without reconfiguring most, if not all of the other battery components.

DETAILED DESCRIPTION OF THE INVENTION

Figure 1:
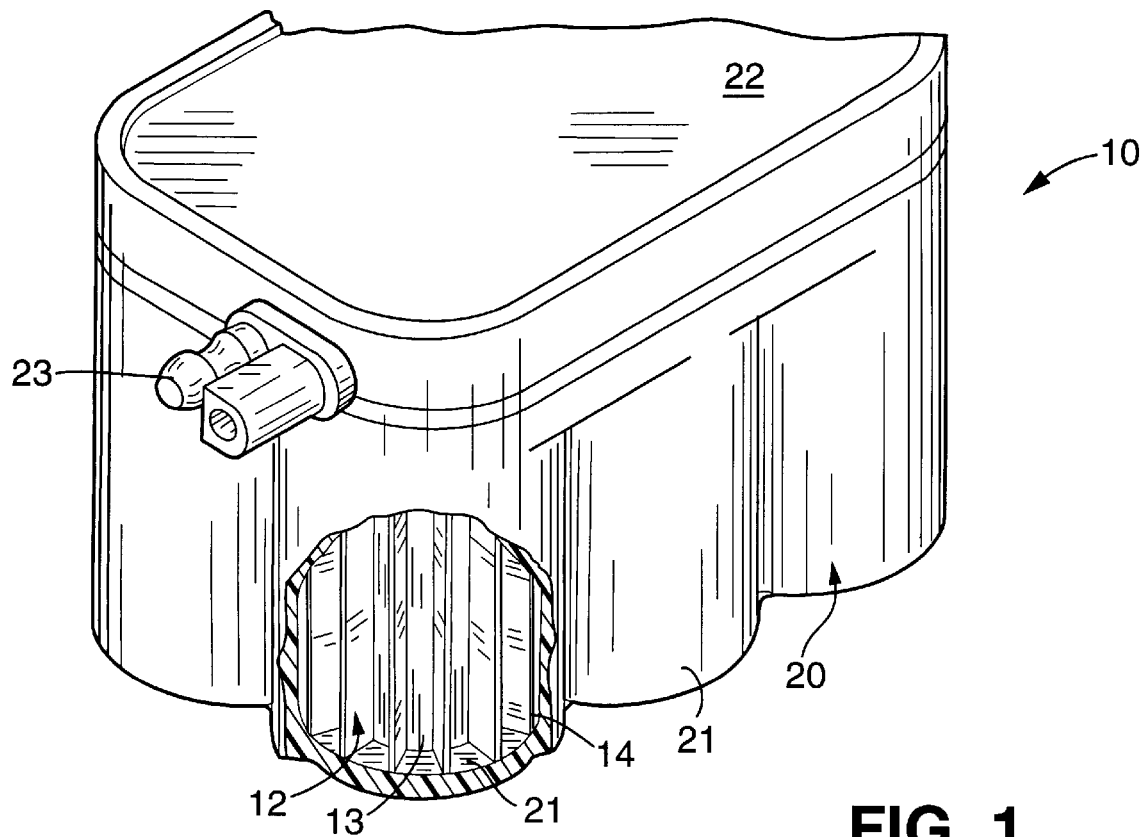
FIG. 1 is a front, top, and side perspective, partial tear-away view of a first preferred embodiment 10 of the lead-acid batteries of the subject invention.
Figure 2:
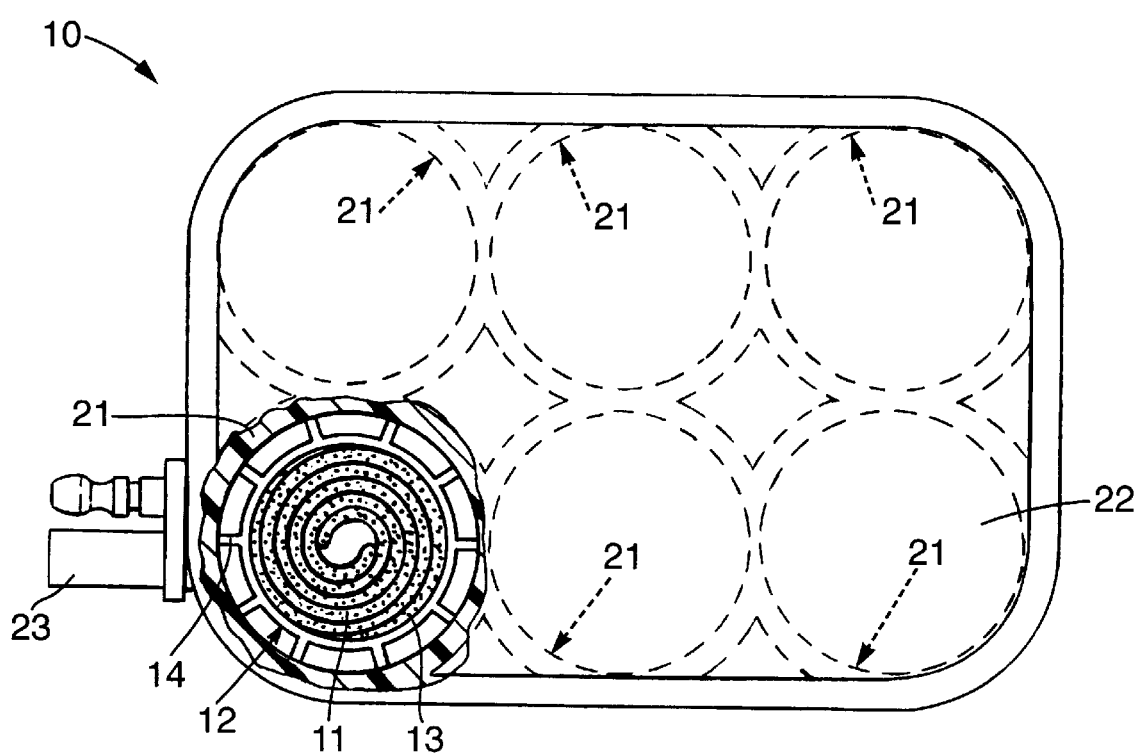
FIG. 2 is a top plan, partial tear-away view of the battery 10 shown in FIG. 1.
Figure 3:
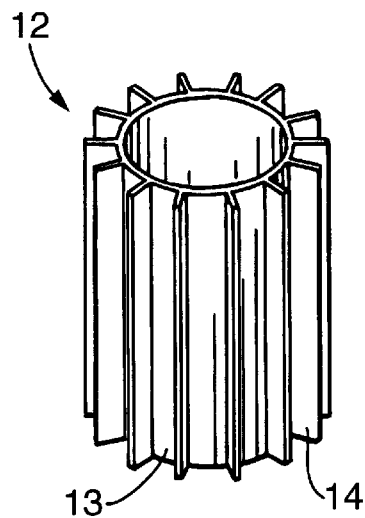
FIG. 3 is a top perspective view of a capacity adapter 12 incorporated in the battery 10 shown in FIG. 1.

FIGS. 1–3 illustrate a first preferred embodiment 10 of the subject invention. The battery 10, as will be appreciated from FIG. 2, has six spiral-wound cell elements 11 (illustrated schematically). Each cell element 11 is fabricated from a generally rectangular-shaped positive plate and negative plate which are interleaved with two sheets of separating material. The plates and separators are then rolled together to form the generally cylindrically-shaped cell element 11.

Spiral-wound elements are particularly suited for use in recombinant lead-acid batteries, but they may be used in flooded systems. Accordingly, the precise composition of the cell elements is not part of the subject invention. The choice of alloys and pastes used to make the positive and negative plates is a matter of choice, dictated in large part by the electrochemical performance characteristics which the battery will have. Many suitable materials are known and may be used. Likewise, many types of separator material are known and may be selected for use as desired.

As is common in spiral-wound batteries, the cell elements of the novel batteries are disposed in a container. The container has a plurality of cell cavities. Each cell cavity is adapted to receive a cell element having a specific maximum electrochemical capacity. The cell elements and cell cavities are ultimately sealed by a cover which attaches to the container.

For example, battery 10 comprises a container 20. Container 20 has six cell cavities 21, as seen best in FIG. 2. A two-piece cover 22, through which project terminals 23, is sealed to the container 20. Cell elements 11 are disposed in each cell cavity 21. The cell elements are electrically interconnected, and ultimately connected to the terminals 23 by straps, intercell connectors, terminal posts, and the like, (not shown). More specifically, the container 20, two-piece cover 22, and top lead components may be fabricated and assembled generally as disclosed in U.S. Pat. No. 4,346,151 to Uba et al.

It will be appreciated, however, that the specific design of those components is not part of the subject invention. So long as the container provides for a plurality of cell cavities, the container may be constructed in any suitable manner, and many designs are known. Likewise, workers in the art will be able to provide suitable covers and top lead components. The design criteria for lead-acid battery containers, covers, and top lead are well known and will be applied in fabricating batteries of the subject invention.

Prior to the subject invention, each of the cell cavities of a battery was adapted to receive a cell element having a specific maximum electrochemical capacity; and, as a result, the cell element occupied substantially the entire internal volume of the cell cavity. This was necessary, for example, in recombinant spiral-wound batteries to provide the cell element with the required degree of compression.

In the batteries of the subject invention, however, the cell elements have an electrochemical capacity less than a specific maximum capacity and are of a size smaller than a cell element having the specific maximum capacity, thus creating a void volume in the cell cavity in which it is disposed. A capacity adapter is disposed in each cell cavity and occupies at least a portion of the void volume.

Thus, while it is theoretically possible to have one or more cell elements that has a capacity much different from that capable of being achieved by the other cell elements, practical considerations make it usually necessary to size each cell element so that the respective cell capacity is generally the same. Accordingly, the less-than-maximum battery capacity will be more desirably obtained by undersizing each cell element sufficiently so that the collective battery capacity is that which is desired for the particular application.

It will be appreciated, that, by utilizing the present invention, different batteries having different electrochemical capacities may be assembled using the same container and cover and much, if not all, of the same top lead. That is, the cell elements in the batteries may be made from smaller plates, thereby reducing the electrochemical surface area and capacity of the cell element. Although the resulting cell elements will also be physically smaller in size, by coordinating the size and configuration of the capacity adapter, the undersized cell element will be positioned in a way to function properly with the same battery components. Thus, there is no need to change the plate composition, or to substantially reconfigure other battery components in order to vary the electrochemical capacity of the resulting batteries.

For example, the cell element 11 in battery 10, as compared to cell elements having a specific maximum capacity and dimensions to be disposed in cell cavities 21, is wound from plates of equal height but reduced length. Thus, cell element 11, while cylindrically shaped, has a diameter less than, and a height substantially equal to, the corresponding dimensions of a cell element having the specific maximum electrochemical capacity.

In accordance therewith, the battery of the first preferred embodiment 10 is provided with a capacity adapter 12. As most clearly seen in FIG. 3, the capacity adapter 12 has a central tubular member 13. The central tubular member 13 has an inner void volume adapted to receive the undersized cell element 11, as shown in FIG. 2. A number of longitudinal ribs 14 extend outwardly from the periphery of the central tubular member 13 and define the outer diameter of the capacity adapter 12, which is substantially equal to the diameter of a cell element having the specific maximum electrochemical capacity. The undersized cell element 11 is disposed within the capacity adapter 12, and together they are disposed coaxially within the cell cavity 21, resulting in a securely positioned undersized cell element 11 adapted for use with common battery components.

Figure 4:
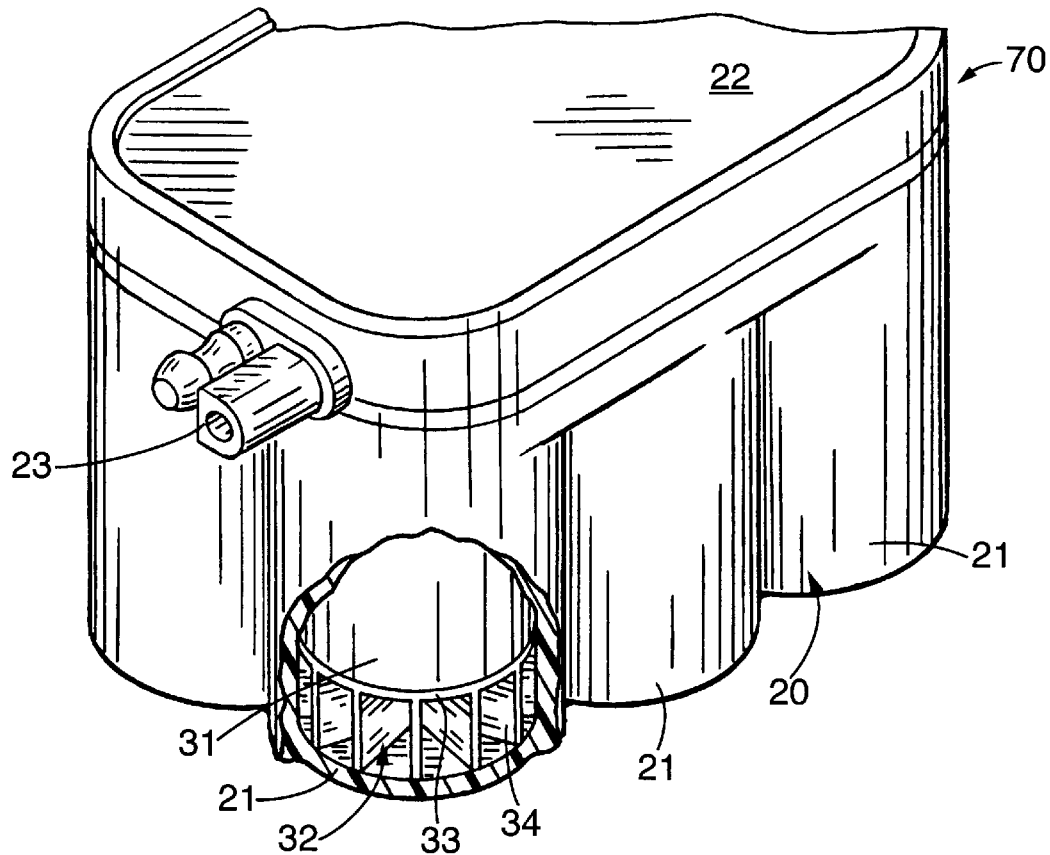
FIG. 4 is a front, top, and side perspective, partial tear-away view of a second preferred embodiment 30 of the lead-acid batteries of the subject invention.
Figure 5:
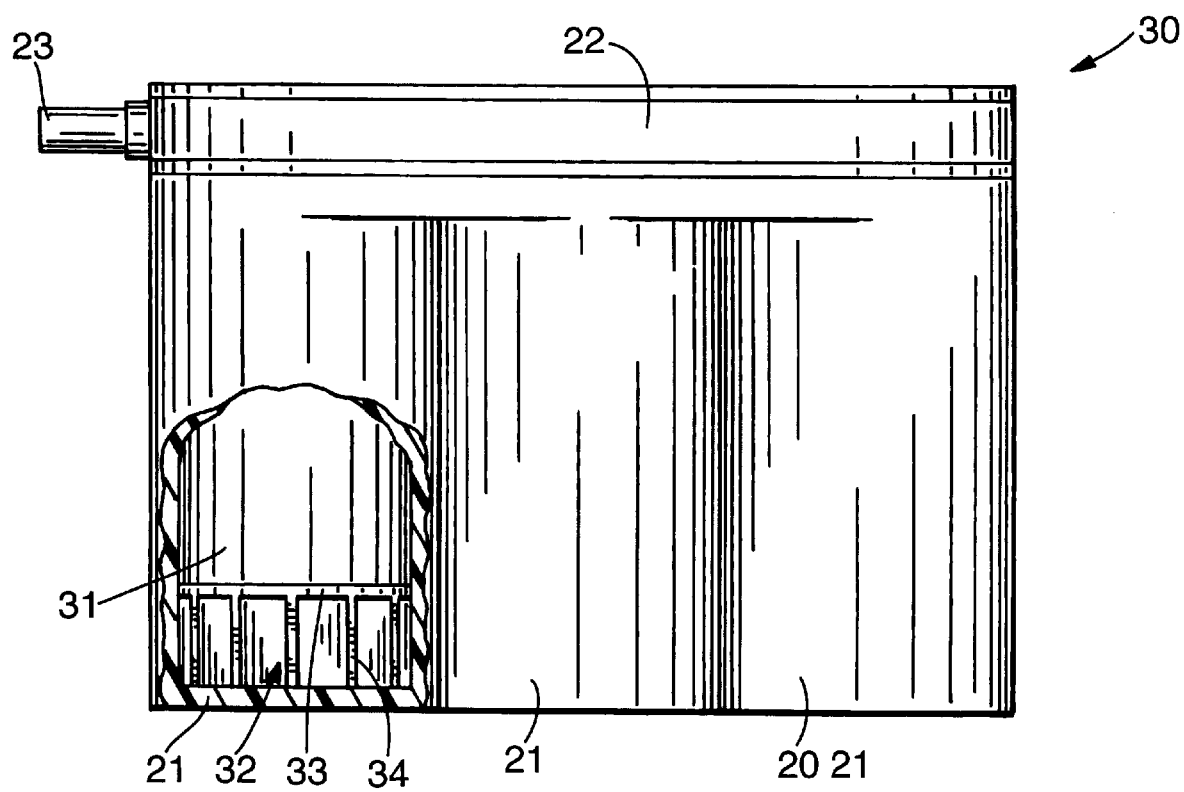
FIG. 5 is a side elevational, partial tear-away view of the battery 30 shown in FIG. 4.
Figure 6:
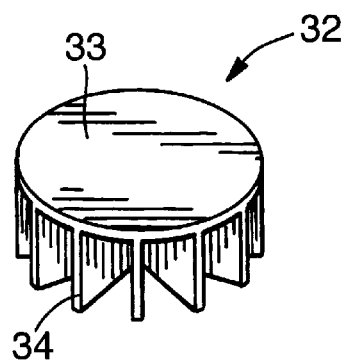
FIG. 6 is a top perspective view of a capacity adapter 32 incorporated in the battery 30 shown in FIG. 4.

Likewise, a second preferred embodiment 30 of the novel batteries, shown in FIGS. 4–6 is provided with a capacity adapter 32. The battery 30 is constructed as is battery 10 (like numerals referring to like elements), except for cell elements 31 and capacity adapters 32. Each cell element 31, as compared to cell elements having a specific maximum capacity and dimensions to be disposed in cell cavities 21, is wound from plates of equal length but reduced height. Thus, undersized cell element 31 is cylindrically shaped and has a diameter substantially equal to and a height less than the corresponding dimensions of a cell element having the specific maximum electrochemical capacity.

The capacity adapter 32 has a disc-shaped member 33 and a plurality of ribs 34 extending outwardly from the central axis of and perpendicular to the planar surface of the disc shaped member 33. The diameter of the capacity adapter 32 is no greater than the diameter of the cell cavity 21. The height of the capacity adapter 32 is coordinated so that the combined height of the undersized cell element 31 and capacity adapter 32 is substantially equal to the height of a cell element having the specific maximum electrochemical capacity. The capacity adapter 32 is disposed at the bottom of the cell cavity 21 under the undersized cell element 31 and secures the undersized cell element 31 in a position whereby common battery components may be utilized.

Figure 7:
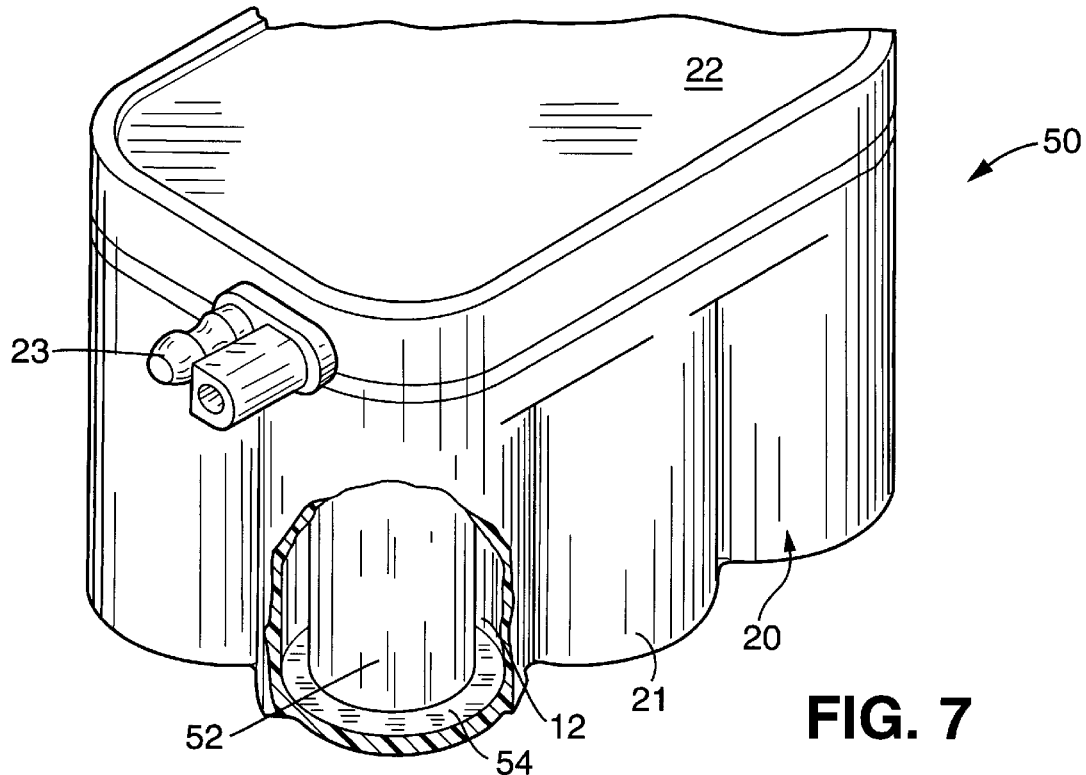
FIG. 7 is a front, top, and side perspective, partial tear-away view of a third preferred embodiment 50 of the lead-acid batteries of the subject invention.

Although the following preferred embodiments require a slight modification of the battery container 20, both present viable alternatives to the separate capacity adapters previously illustrated. The third preferred embodiment 50, shown in FIG. 7, is provided with a capacity adapter 52. The battery 50 utilizes the undersized cell element 11 and is constructed similar to the battery 10 in the first embodiment (like numerals referring to like elements), however the capacity adapter 52 is integrally formed within the cell cavity 21. The capacity adapter 52 is a central tubular member formed integrally with the lower horizontal surface 54 of the cell cavity 21. The inner void volume of the capacity adapter receives the undersized element 11. The outer diameter of the capacity adapter does not exceed the inner diameter of the cell cavity 21. The undersized cell element 11 is disposed within the capacity adapter 52 and secured in a position to permit the use of common battery components.

Figure 8:
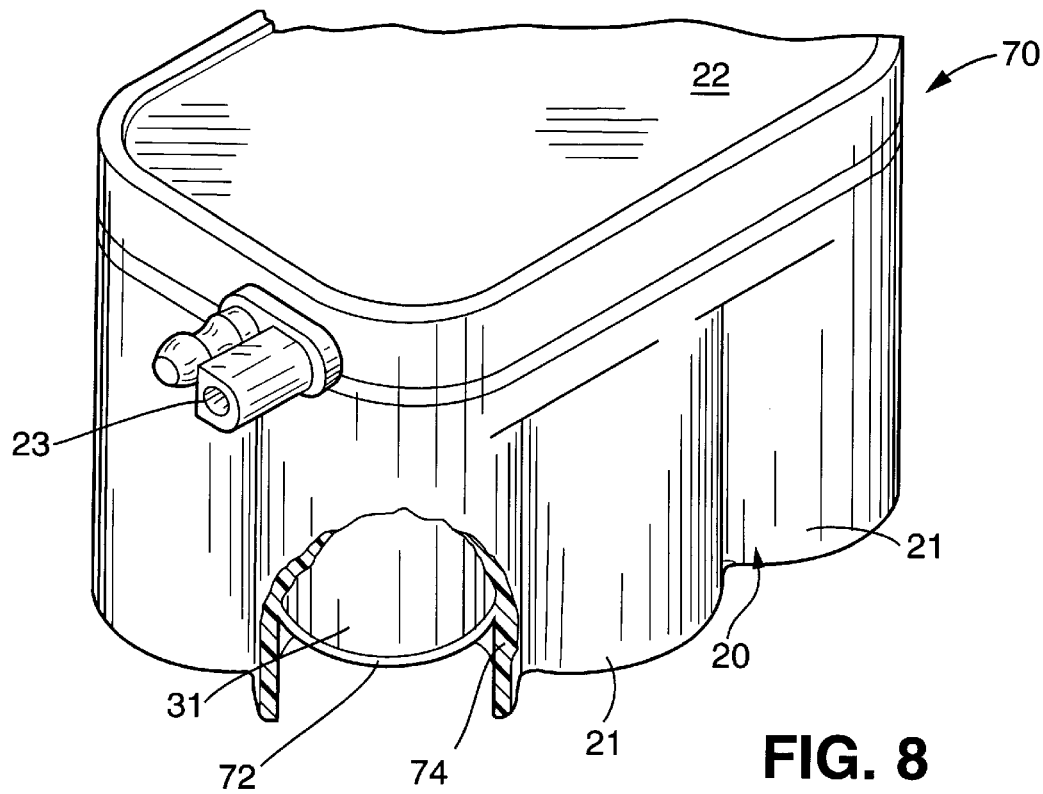
FIG. 8 is a front, top, and side perspective, partial tear-away view of a fourth preferred embodiment 70 of the lead-acid batteries of the subject invention.

A fourth preferred embodiment 70, shown in FIG. 8, is provided with a capacity adapter 72. The battery 70 utilizes the undersized cell element 31 and is constructed similar to the battery 30 in the second embodiment (like numerals referring to like elements) with the exception that the capacity adapter 72 is integrally formed within the cell cavity 21. The capacity adapter 72 is a disc shaped member integrally formed with the vertical wall 74 of the cell cavity 21. The capacity adapter 72 serves as the lower horizontal surface of the cell cavity upon which the undersized element 31 rests. The height at which the capacity adapter 72 is formed within the cell cavity 21 is coordinated so that the height of the undersized element resting on the capacity adapter 72 is substantially equal to the height of a cell element having a specific maximum electrochemical capacity. As a result, common battery components may be utilized with this embodiment.

It will be appreciated, therefore, that the capacity of batteries using the same container, or a slight modification thereof, and cover may be varied with ease and economy. Accordingly, the plate materials are not varied, only the dimensions of the plates and capacity adapters. The precise capacity of the cell elements is a matter of choice. In general, the container will be fabricated having the highest-rated capacity in mind. A complementary line of batteries having the same external size and configuration may then be assembled from different size cell elements and capacity adapters. The exact size of the cell elements and capacity adapters can be coordinated to provide whatever lower-rated capacities are desired. As an illustrative example, the capacity can range from about 20 to about 60 Ampere Hours at a 20-hour rate.

The capacity adapters may be easily fabricated, for example, from injection-molded thermoplastics such as polypropylene and ethylene-propylene copolymers which are commonly used to fabricate plastic battery components. The capacity adapters may be fabricated as or molded within the containers as solid volumes. However, the ribbed designs exemplified in capacity adapters 12 and 32 and the walled designs illustrated in capacity adapters 52 and 72 create a more economical product, given their reduced material costs, as compared to solid volumes. Of course, ribbing and other material reducing designs may be utilized to create an infinite number of functional configurations for such capacity adapters.

The illustrated capacity adapters are preferred for other reasons as well, especially capacity adapters 32 and 72 in batteries 30 and 70 respectively. The location of the top of the undersized cell element 31 within the cell cavity 21, by virtue of the capacity adapters 32 or 72, is identical to that of a specific maximum capacity cell element. Thus, the same top lead may be used to interconnect the undersized cell elements 31 as would be used in a battery having cell elements of a specific maximum capacity. Such a battery, however, would have a reduced electrochemical capacity relative to a battery having all cell elements of a specific maximum electrochemical capacity.

In batteries 10 and 50, the top of undersized cell element 31 is somewhat smaller than a full size cell element. Thus, some modification of the top lead may be needed, but it would be expected to be relatively minor.

The subject invention, therefore, allows a battery manufacturer to produce a line of batteries having different electrochemical capacities but having the same physical size, utilizing the same container (with the exception of slight modification in limited circumstances), same cover, and most, if not all of the same top lead. This offers significant economies as compared to redesigning the container to fit different sized cell elements, to reconstituting the cell elements, or to other approaches for maintaining the same external size and configuration while varying the capacity of batteries.

This invention has been disclosed and discussed primarily in terms of specific embodiments thereof, but it is not intended to be limited thereto. Also, the illustrated batteries have six cells, but greater or fewer cells may be utilized, and some, but not all of the cells may utilize undersized cell elements and capacity adapters. Other modifications and embodiments will be apparent to workers in the art.

I claim:

1. A multicell, lead-acid battery having a desired electrical capacity which ranges from a minimum to a maximum battery capacity comprising:

a container having a plurality of cell cavities, each cell cavity having height and diameter dimensions adapted to receive a spiral wound cell element having a maximum electrochemical capacity and a battery capacity greater than said desired maximum battery capacity;

a plurality of interconnected spiral-wound lead-acid cell elements providing a lead-acid battery having said desired electrical capacity, said cell elements physically sized to be disposed in said cell cavities and having a capacity less than said maximum cell capacity and having a height or a diameter dimension less than the corresponding dimension of said maximum capacity cell element, creating a void volume in said cell cavity; and a capacity adapter positioned in said cell cavity, said capacity adapter being dimensioned to occupy at least a given part of said void volume.

2. The multicell, lead-acid battery of claim 1, wherein the height of said lower capacity cell element is substantially equal to that of said maximum capacity cell elements and the diameter of said lower capacity cell element is less than that of said maximum capacity cell element, said capacity adapter further comprising:

a central tubular member having an inner void volume adapted to receive said lower capacity cell element wherein said central tubular member height does not exceed that of said maximum capacity cell element and said central tubular member outer diameter is less than the diameter of said maximum capacity cell element; and a plurality of longitudinal ribs extending outwardly from the periphery of said central tubular member and defining the outer diameter of said capacity adapter, said outer diameter being is substantially equal to the diameter of said maximum capacity cell element.

3. The multicell, lead-acid battery of claim 1, wherein the height of said lower capacity cell elements is substantially equal to that of said maximum capacity cell element and the diameter of said lower capacity cell element is less than that of said maximum capacity cell element, said capacity adapter further comprising a central tubular member having an inner void volume adapted to receive said lower capacity cell elements wherein said central tubular member height does not exceed that of said maximum capacity cell element and said central tubular member outer diameter is substantially equal to the diameter of said maximum capacity cell element.

4. The multicell, lead-acid battery of claim 1, wherein the height of said lower capacity cell elements is less than that of said maximum capacity cell element and the diameter of said lower capacity cell elements is substantially equal to that of said maximum capacity cell element, said capacity adapter comprising:

a disc shaped member having a diameter no greater than that of said cell cavity and a height less than that of said maximum capacity cell element; and a plurality of ribs extending outwardly from the central axis of said disc shaped member to the outer diameter of said disc shaped member and in a direction perpendicular to the planar surface of said disc shaped member, wherein the combined height of said lower capacity cell element and said capacity adapter is substantially equal to that of said maximum capacity cell element.

5. The multicell, lead-acid battery of claim 1, wherein the height of said lower capacity cell elements is less than that of said maximum capacity cell element and the diameter of said lower capacity cell elements is substantially equal to that of said maximum capacity cell element, said capacity adapter comprising a cylindrical shaped member having a diameter that does not exceed the diameter of said maximum capacity cell element and a height less than that of said maximum capacity cell element, wherein the combined height of said lower capacity cell element and said capacity adapter is substantially equal to that of said maximum capacity cell element.

6. A multicell, lead-acid battery having a desired electrical capacity which ranges from a minimum to a maximum battery capacity comprising:

a container having a plurality of cell cavities each having height and diameter dimensions adapted to receive a spiral wound cell element having a specific maximum cell capacity, each cell cavity having an integrally formed capacity adapter being sized to receive a spiral wound element having an electrochemical capacity less than said maximum capacity and a height or diameter dimension less than the corresponding dimension of said maximum capacity cell element; and a plurality of electrically interconnected spiral-wound lead-acid cell elements providing a lead-acid battery having the desired battery capacity disposed in said cell cavities.

7. The multicell, lead-acid battery of claim 6, wherein the height of said lower capacity cell elements is substantially equal to that of said maximum capacity cell element and the diameter of said lower capacity cell elements is less than that of said maximum capacity cell element, each of said cell cavities having a bottom surface and having an integrally formed capacity adapter which comprises a central tubular member integrally formed with said cell cavity, said central tubular member having an outer diameter and an inner void volume adapted to receive said lower capacity cell element, said central tubular member height not exceeding that of said maximum capacity cell element, and the outer diameter of said central tubular member not exceeding the diameter of said maximum capacity cell element.

8. The multicell, lead-acid battery of claim 6, wherein the height of said lower capacity cell elements is less than that of said maximum capacity cell element and the diameter of said lower capacity cell elements is substantially equal to that of said maximum capacity cell element, each of said cell cavities having a bottom and upstanding walls and said capacity adapter comprising a substantially horizontal disc shaped member integrally formed with said upstanding walls of said cell cavity, said disc shape member serving as the bottom of said cell cavity, the height of said lower capacity cell element being substantially equal to the height of said maximum capacity cell element disposed in said cell cavity adapted to receive maximum capacity cell element.

* * * * *